United States Patent [19]

Allina

[11] Patent Number: 5,140,491

[45] Date of Patent: Aug. 18, 1992

[54] TVSS APPARATUS WITH ARC-EXTINGUISHING

[76] Inventor: Edward F. Allina, 605 Capri Blvd., Treasure Island, Fla. 33706

[21] Appl. No.: 658,930

[22] Filed: Feb. 21, 1991

Related U.S. Application Data

[63] Continuation-in-part of Ser. No. 488,677, Mar. 5, 1990, which is a continuation-in-part of Ser. No. 286,446, Dec. 20, 1988, Pat. No. 4,907,119, which is a continuation-in-part of Ser. No. 923,524, Oct. 28, 1986, Pat. No. 4,931,895, and a continuation-in-part of Ser. No. 123,419, Jan. 12, 1988, Pat. No. 4,901,187, and a continuation-in-part of Ser. No. 185,584, Apr. 22, 1988, abandoned, and a continuation-in-part of Ser. No. 185,587, Apr. 22, 1988, Pat. No. 4,866,560.

[51] Int. Cl.$^5$ .............................................. H02H 9/06
[52] U.S. Cl. ........................................ 361/56; 361/127; 337/256
[58] Field of Search ............... 361/117, 127, 126, 366, 361/56, 104; 338/21; 337/241, 256, 376, 217

[56] References Cited

U.S. PATENT DOCUMENTS

| | | | |
|---|---|---|---|
| 3,987,343 | 10/1976 | Cunningham et al. | 361/127 |
| 4,439,807 | 3/1984 | Reitz | 361/127 |
| 4,736,181 | 4/1988 | Dornauer | 337/217 |

Primary Examiner—Todd E. DeBoer
Attorney, Agent, or Firm—Charles A. McClure

[57] ABSTRACT

Electrical transient surge protection of electrical equipment downstream from a power source plus safeguarding of apparatus for providing such surge protection against failure at high currents or high temperature. Non-linear over-voltage means, such as varistors, function to clip transient voltage surges and to shunt resulting currents to ground so as to protect watt-hour meters and downstram loads from electrical surges. Adjacent arc-extinguishing components aid in safeguarding varistors or similar over-voltage means from potentially catastrophic destruction in the event of extreme overheating from unusually frequent or prolonged surges. Such apparatus may be located in such diverse places as a power line weatherhead, a watt-hour meter base, an adapter between a meter base and its normal mounting socket, or a utility panel having such a socket, or in a circuit-breaker panel or even an electrical outlet receptacle downstream of the meter and upstream of metered electrical loads.

2 Claims, 3 Drawing Sheets

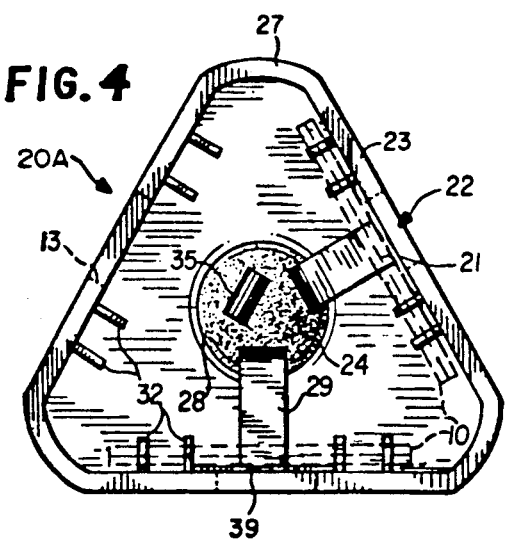
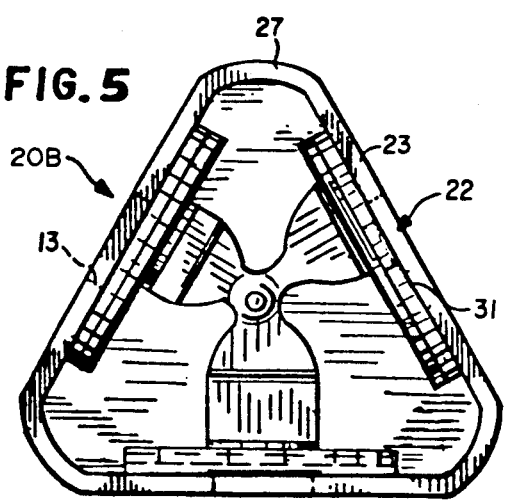
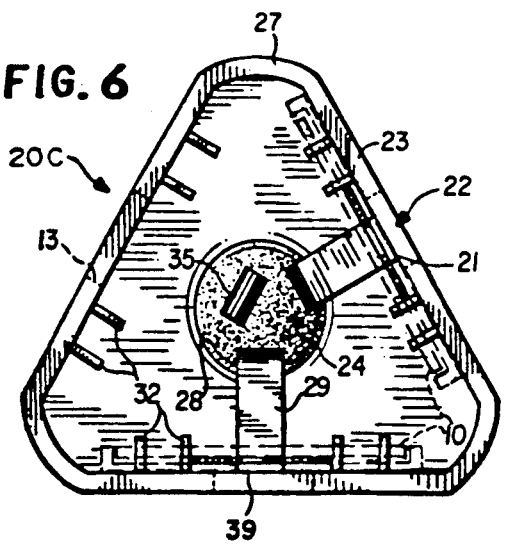
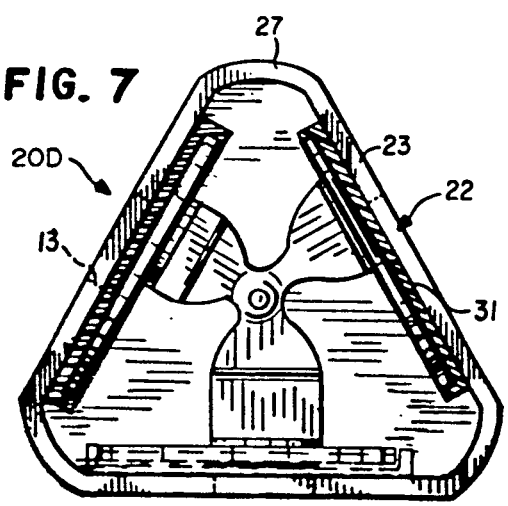

TVSS APPARATUS WITH ARC-EXTINGUISHING

This patent application is a continuation-in-part of my copending application Ser. No. 488,677 filed 5 Mar. 1990—which in turn is a continuation-in-part of application Ser. No. 07/286,446 filed Dec. 20, 1988, now U.S. Pat. No. 4,907,119, which is a continuation-in-part of application Ser. No. 06/923,524 filed Oct. 28, 1986, now U.S. Pat. No. 4,931,895 and a continuation-in-part of application Ser. No. 07/123,419 filed Jun. 12, 1988, now U.S. Pat. No. 4,901,187 and a continuation-in-part of application Ser. No. 07/185,584 filed Apr. 22, 1988, now abandoned, and a continuation-in-part of application Ser. No. 07/185,587 filed Apr. 22, 1988, now U.S. Pat. No. 4,866,560.

FIELD OF THE INVENTION

This invention relates to electrical transient surge suppression (TVSS) apparatus and especially physical modification thereof to safeguard it and its surroundings in the event of arcing inside, as from some component failure at high voltage surges and currents.

BACKGROUND OF THE INVENTION

The present inventor has fostered not only the adoption of TVSS to protect downstream electrical equipment from incoming power line surges—such as from lightning strikes or switching transients—but also the safeguarding of TVSS apparatus from possible catastrophic failure if the current loads become excessive. Applicant's surgeprotective apparatus utilizes varistors or equivalent non-linear resistance means as components in their usual disklike form to shunt surge currents to ground. Prime locations for TVSS apparatus are at the weatherhead, or between the watt-hour meter and its usual socket, or in a wall panel or in packaged adapters downstream of the meter and upstream of electrical equipment to be so protected.

A common feature of packaged forms of TVSS is lack of capacity to carry extreme current densities. Metal oxide varistors can shunt considerable surge currents to ground and thereby protect downstream equipment, but repeated surge conduction increases the likelihood of failure in associated equipment or in TVSS apparatus itself, if cooling time and paths are inadequate. Varistors may get so hot therefrom as to reach a characteristic failure temperature, resulting in loss of physical integrity—perhaps explosively—often with arcing.

A known type of downstream surge-protective device is often packaged in typical polyhedral form. An example of such device is disclosed by Reitz as a "Secondary Arrester" in U.S. Pat. No. 4,439,807. Commercial for many years, such device lacked appropriate fusing.

Rather than to rely upon the installers of prepackaged surge-protective equipment to provide adequate local fusing to protect it from possible overloading and failure, it is preferable to include in a TVSS package effective means to increase its current-carrying capacity, to inhibit its temperature rise, to disconnect it from the power lines if failure becomes imminent, and to extinguish any arc arising from inadequacy of conduction capability, overheating, etc.

Varistors have characteristic failure temperatures at which not only their electrical conduction but also their structural integrity is impaired and at which an electrical arc fire may occur, damaging adjacent equipment nearby and perhaps being more broadly damaging.

The present inventor has pioneered increases in surge capacity and safety of TVSS apparatus by heat-sinking component varistors (in U.S. Pat. No. 4,931,895); by stacking varistor disks in parallel circuit (in U.S. Pat. No. 4,901,187); by using temperature-responsive "thermal" fuses or similar cutoff devices to sense temperature of varistors and to disconnect them from the power lines in the rare but possible event of excessive temperature rise (in U.S. Pat. No. 4,866,560); and by including distributed-resistance fuse links—with or without thermal cutoff means and/or varistor stacking—between power line leads and such varistor (in U.S. Pat. No. 4,907,119).

The present invention relates to extension of such improvements to automatic extinguishment of electrical arcs in surge-protective apparatus, as exemplified in a prepackaged TVSS device suitable for use in a weatherhead, meter adapter, utility panel, downstream plug-in to an electrical outlet, or at other surge-sensitive locations.

SUMMARY OF THE INVENTION

Apparatus of this invention preferably includes an electrically non-conductive housing containing for each phase of an electrical power source at least one varistor in disklike form connected at one face to a power line phase lead and connected at the opposite face to an external ground. Exemplified here is a conventional housing of preferably triangular or hexagonal cross-section, with alternating wide flat sides and relatively narrow arcuate sides (or apex edges). Capped at one end, it has protruding from its other end electrical leads to external power and ground leads or terminals.

A primary object of the present invention is to safeguard TVSS apparatus from electrical arcing at high temperatures, such as may occur in the event of a prolonged voltage surge or prolonged period of excessively frequent surges and/or too high average voltage.

Another object of the invention is to enhance the safety of usage of varistors in treating large transient electrical surges.

A further object is to combine arc-extinguishment with other features safeguarding varistors safeguarding downstream equipment.

In general, the objects of the present invention are attained, in transient voltage surge suppression (TVSS) apparatus containing a varistor, by an adjacent inherently arc-extinguishing component. More particularly, such adjacent component is preferably provided in the form of an adjoining block, cup, cylinder, disk, or ring-like housing member. The objects are accomplished by embodying alongside a varistor an ablative composition adapted to extinguish an electric arc incident to, or likely upon, varistor failure from overheating.

Such practice is compatible with various means and methods of over-voltage, over-current, and over-temperature protection, such as may include parallel stacking of varistors, ground plane heat-sinking of varistors, and/or thermal fuse safeguarding of varistors.

Other objects of the present invention, together with means and methods for attaining the various objects, will become apparent from the following descriptive text and the accompanying diagrams, all presented here by way of example rather than limitation.

SUMMARY OF THE DRAWINGS

FIG. 4 is a transverse section showing varistor locations in an apparatus comprising components shown in the preceding views;

FIG. 5 is a similar sectional view with varistors and adjacent means of this invention shown in place;

FIG. 6 is a section similar to FIG. 4, suggesting locations of a modified embodiment of the present invention; and FIG. 7 is a section related to FIG. 6 in like manner as FIG. 5 relates to FIG. 4.

DETAILED DESCRIPTION

Figure 1:
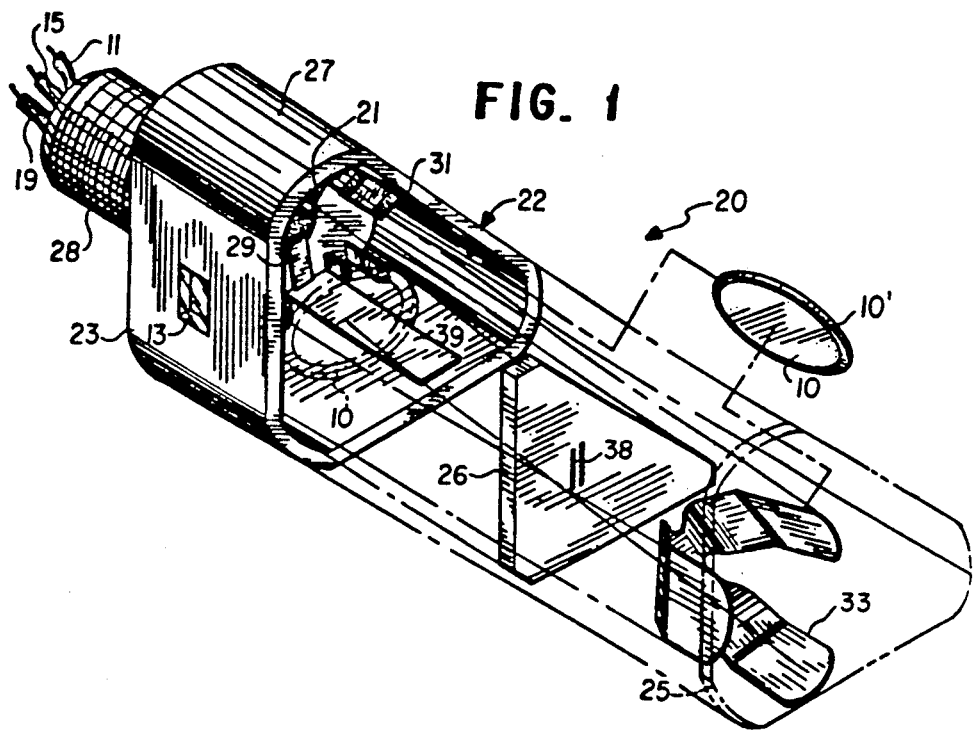
FIG. 1 is an exploded perspective view of apparatus well suited to the practice of this invention.
Figure 2:
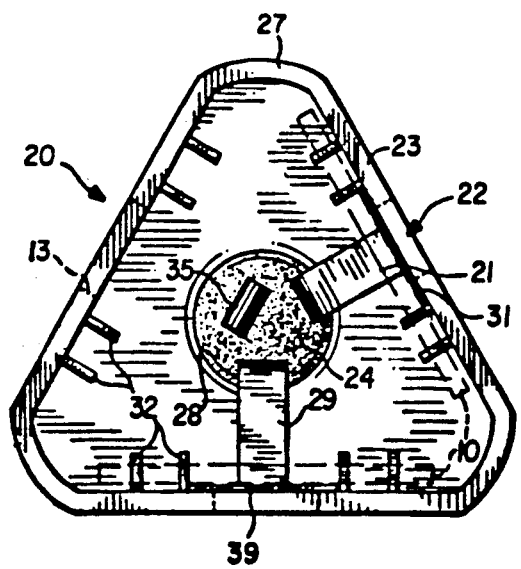
FIG. 2 is a transverse section through such apparatus.

FIGS. 1 and 2 show embodiment 20 of transient electrical voltage surge suppression (TVSS) apparatus of this invention. FIG. 1 is in perspective and is partially exploded for clarity of assembly, whereas FIG. 2 is in plan, looking in on housing 22 and its contents before being closed off by cover 25 (broken lines). Housing 22 is polygonal in transverse cross-section and indeed substantially hexagonal, with three relatively wide flat sidewalls 23 (one or more with a translucent window 13 therein) alternating with a like number of relatively narrower arcuately curved sidewalls (or apex edges) 27. A varistor 10 (with insulating collar 10,) is shown parallel to but offset from one wide flat wall. For convenience of description, the end of housing 22 closed by the mentioned cover is taken as the top notwithstanding that such end is shown lower than the opposite end (or bottom) in FIG. 1. At its opposite end (bottom) the housing has open-ended externally threaded fitting 28 filled with potting material 24 from which electrical leads 11, 15, and 19 emerge to the exterior—11 and 19 to an external power source, and 15 to an external ground (neither visible here). Correspondingly visible inside are ground terminal 35 (from neutral lead 15) and terminal portions 31 and 39 of distributed-resistance fuse links 21 and 29 from respective phase leads 11 and 19 (see FIG. 2 as well as FIG. 1).

It will be understood that an additional phase line (such as C, not shown) may be added for three-phase power operation. An added phase line would provide for the third phase line the same features as already described for a pair of phase lines. Of course, three leads are provided likewise inside housing 22 in such event.

During assembly of the apparatus shown exploded in FIG. 1, three-lobed resilient grounding insert 33 is compressed sufficiently to slide into the housing, where its lobes will contact the available faces of respective varistors, and its center will contact ground terminal 35 emergent from the potting material and protruding (when assembled) into and through slot 38 in triangular disklike piece 26 of foamed insulation. Then the cover is fitted onto the top of the housing and is sealed thereto in suitable manner, such as adhesively, or by dielectric heating, etc. Similarly emergent pair of distributed resistance fuse links 21 and 29 terminate in portions 31 and 39 alongside wide inside walls of the housing for contact with the opposite faces of such varistors—and optionally a third fuse link (say, 26) with corresponding terminal portion (say, 36).

FIG. 2 shows that each flat sidewall of housing 22 is provided inside with two widely spaced pairs of narrow bosses 32 closely spaced in each pair. The bosses nearer the center of the flat sidewall are shorter lengthwise of the housing than are the flanking ones. Varistors 10 (one of which is shown outside the housing in the exploded view of FIG. 1) are indicated (in broken lines) resting edgewise upon the bosses and adjacent a pair of sidewalls inside the housing, the outward facing face of each in contact with a fuse link 39 from one of the phase leads.

Figure 3:
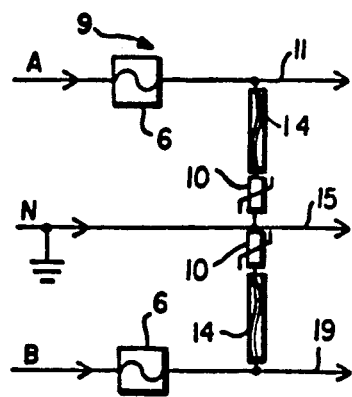
FIG. 3 is a schematic diagram of such apparatus in circuit.

FIG. 3 shows diagrammatically electrical circuit arrangement 9 in which the apparatus of FIGS. 1 and 2 provides substantial protection for downstream equipment—though not necessarily for component varistors. At the left edge are power lines A, N, and B connecting (arrows at left) respectively to leads 11, 15, and 19 directed (arrows at right) to electrical load equipment downstream—not shown. Neutral line N is grounded; formerly it was often missing and/or combined with one of the other lines. Leads 11 and 19 from respective phase lines A and B contain (one each) conventional localized-resistance fuses 6—shown in such manner as to suggest that they are relatively short and have a spaced surrounding shell. Distributed-resistance fuse links 14—shown in form suggesting greater length and a closer-fitting insulation jacket—are connected in series with varistors 10 (one shown per fuse link) between power line leads 11 and 19, and ground lead 15. In a corresponding three-phase arrangement (not shown) a lead (16) from a third phase line (C) would also have a fuse link (14) and a varistor (10) between it and the neutral line (N) lead (15) to an available external ground.

FIGS. 4 to 7 are transverse sectional views of respective versions (20A, 20B, 20C, and 20D) of generalized embodiment 20 of the preceding views but with addition of arc-extinguishment capability. FIGS. 4 and 6 are taken below (to the left in FIG. 1) of the varistor locations with adjacent components (shown dashed), whereas FIGS. 5 and 7 are taken above (right) and, thus, shown in solid lines: varistors 10 in all four views, arc-extinguishing discs 10X in FIGS. 4 and 5, and cups 10XX in FIGS. 6 and 7.

In all of embodiments 20A, 20B, 20C, and 20D the respective added components are shown sandwiched between a varistor disc and the housing wall. In embodiments 20C and 20D, the cup lip extends around the varistor rim as well. Embodiments 20A (FIG. 4) and 20C (FIG. 5) indicate varistor disc 10 and added anti-arc disk 10X and cup 10XX, respectively, in only two of the available three locations, it being understood that the third available location may be occupied similarly. Embodiment 20B (FIG. 5) and embodiment 20D (FIG. 7) show such components (in solid lines) at two of the three locations—one of them being unoccupied in FIGS. 4 and 6—and in dashed lines suggest an optional third set for three-phase usage.

The following views show details of diverse embodiments of the arc-extinguishing component, as in disc, cup, and cylindrical form.

Figure 8:
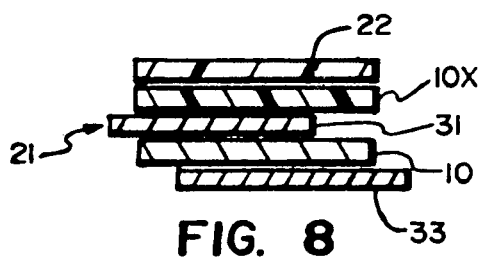
FIG. 8 is an enlarged detail in the vicinity of a phase lead and a varistor for one embodiment form.

FIG. 8 shows clearly the sandwiching of terminal portion 31 of phase lead 21 (preferably a distributed-resistance fuse link) by and between a face of varistor 10 and disk 10X of arc-extinguishing composition. This may cant the varistor slightly, rendering such terminal portion invisible from above (from the right here) but tends to aid, rather than hinder, the sliding entry of the contacting lobe of grounding insert 33 during assembly.

Figure 9:
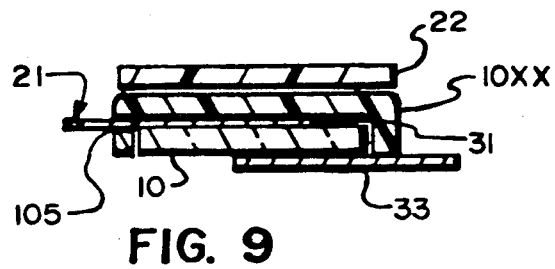
FIGS. 9 and 10 are corresponding detail views of two versions of another embodiment form on an enlarged scale.

FIG. 9 shows similar sandwiching of terminal portion 31 between the inside face of cuplike member 10XX, suitably slotted or relieved at its lower (here left) edge to admit the terminal. The varistor is somewhat thicker than the adjacent extent of the lip of the cup, to assure contact with the adjacent lobe of the grounding insert 33.

Figure 10:
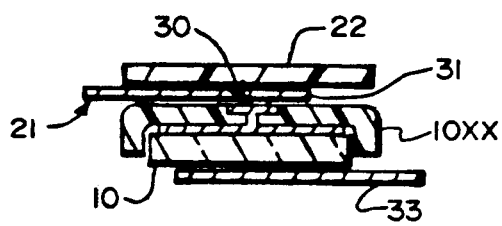

FIG. 10 shows terminal 31 sandwiched between the inside wall of housing 22 and the outer surface of electrically conductive grommet/rivet 40 through cup 10XX. The inner face of such conductive member is in direct contact with varistor 10 inside the cup.

Figure 11:
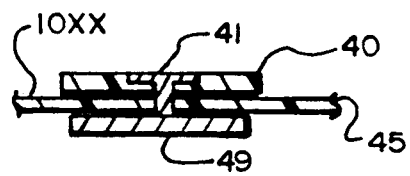
FIG. 11 is a detail (further enlarged) from FIGS. 9 and 10.

FIG. 11 shows the conductive grommet/rivet somewhat enlarged. It may be inserted as a grommet in the cup during manufacture, such as in a molding operation. Alternatively, it may be swaged into a base opening in the cup, much as in a riveting operation. Whereas the cup comprises an arc-extinguishing composition, which is non-conductive in solid form, the conductive grommet/rivet is metallic, such as copper or an alloy thereof.

Figure 12:
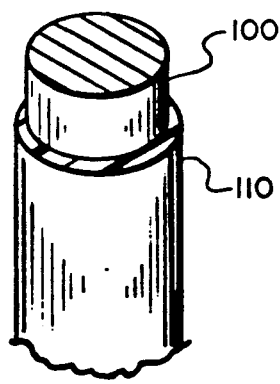
FIG. 12 is a section through a cylindrical embodiment.

FIG. 12 shows solid cylindrical varistor 100 surrounded by hollow cylindrical arc-extinguishing housing component 110 (sectioned).

A substantial patent literature exists about arc-extinguishing capabilities of such organic materials as thermosetting resins, with or without added inorganic materials—as well as inorganics alone. Examples in U.S. patents include acetals (Gainer et al. U.S. Pat. No. 3,059,081; Heft U.S. Pat. No. 3,632,926; Monagan U.S. Pat. No. 4,032,879), epoxy (Nichols et al. U.S. Pat. No. 3,586,802) and polyester (Ellsworth et al. U.S. Pat. No. 3,071,666; Jones et al. U.S. Pat. No. 3,242,257; Leach et al. U.S. Pat. No. 4,339,742) plus "bakelite" type phenol-formaldehyde or melamine-formaldehyde compositions. Sometimes inorganic materials, such as alumina hydrate and/or various clays, are included as well.

Desired characteristics for arc-quenching compositions were discussed (and references cited) in proceedings of the 7th IEEE/PES Transmission and Distribution Conference and Exposition, Apr. 1979. A particularly interesting paper from those proceedings is entitled "Arc Quenching Materials for Load-Break Separable Insulated Connectors" by R. B. Steel, P. G. Chamy, and R. L. Gabriel of the General Electric Company. Under its brand name "ARCMATE" that company sells a composition useful as such and according to the present invention. Other ablative (arc-extinguishing) compositions actuated at varistor, overheating failure temperature or by arcing, whether acetal, epoxy, polyester, "bakelite" or other type, may be added or substituted.

Housings may be made of any of many electrically non-conductive polymeric materials resistant to high-temperature degradation. Epoxy resin or other polymer may be reinforced with glass fibers, if desired. The illustrated polyhedral housing is similar to that of the noted Reitz U.S. Pat. No. 4,439,807 and sold by General Electric Co. A housing may comprise an ablative composition at least in part.

Translucent—optionally transparent—windows for such housings may be made of a clear acetal or of methyl methacrylate or similar materials meeting the requirements for such non-conductive housings. Like the housing sidewalls, the windows are conveniently several millimeters thick. Their combination of thickness and clarity should be such that smoke deposited upon their inside surface will be apparent from outside.

Varistors are available from well known sources, such as under the brand name Panasonic. Other varistor sources include General Electric, McGraw-Edison, and Siemens. Varistors are conveniently disklike and in this described apparatus (and/or use) preferably are not covered, measure about several centimeters in diameter, about several millimeters thick, and weigh on the order of a dozen grams (plus or minus about half as much for each measure or dimension).

Variants in the apparatus and method of this invention have been suggested in this specification, and other modifications may be made, as by adding, combining, subdividing, or deleting parts or steps, while retaining at least some of the advantages and benefits of the invention—which itself is defined in the following claims.

I claim:

1. In a method of preventing transient elecrtrical surges, received in a circuit from an upstream power source, from going downstream, including shunting resulting surge currents to ground via disklike overvoltage means comprising a two-faced varistor and located in a housing having a flat sidewall, the improvement comprising locating such varistor along the sidewall, and juxtaposing laminar means comprising an arc-quenching composition at varistor failure temperature to substantially all of one face of such varistor, including sandwiching the laminar means with arc-quenching composition between such sidewall of the housing and face of such varistor.

2. In a method of preventing transient electrical surges, received in a circuit from an upstream power source, from going downstream, including shunting resulting surge currents to ground via two-faced disklike over-voltage means including two varistors stacked in electrical parallel circuit, the improvement comprising juxtaposing laminar means comprising an arc-quenching composition at varistor failure temperature to substantially all of one face of such varistors, including sandwiching the laminar means with arc-quenching composition between the stacked varistors.

* * * * *